United States Patent [19]

Hess

[11] 4,440,411
[45] Apr. 3, 1984

[54] VEHICLE HUB STEP

[76] Inventor: Walter R. Hess, 690 Washington Ave., Carlstadt, N.J. 07072

[21] Appl. No.: 389,351

[22] Filed: Jun. 17, 1982

[51] Int. Cl.³ .............................................. B60R 3/00
[52] U.S. Cl. .................................... 280/165; 301/5 R
[58] Field of Search ................ 280/163, 165; 220/1 T, 220/19; 52/180, 296, 653; 301/5 R, 43, 44 R, 44 T, 44 B, 53; 362/376; 301/40 R, 40 S, 38 R, 39 T, 52

[56] References Cited

U.S. PATENT DOCUMENTS

| D. 79,005 | 7/1929 | Ambrose | 301/39 T |
|---|---|---|---|
| 579,133 | 3/1897 | Cole | 280/165 |
| 2,308,855 | 1/1943 | Bartsch | 52/180 X |
| 2,336,959 | 12/1943 | Redman | 301/38 R |
| 2,344,306 | 3/1944 | Hyman | 280/165 |
| 3,288,488 | 11/1966 | Shinn | 280/165 |

FOREIGN PATENT DOCUMENTS 232883  8/1963  Austria ................................. 301/43

Primary Examiner—David A. Scherbel
Attorney, Agent, or Firm—Sughrue, Mion, Zinn, Macpeak & Seas

[57] ABSTRACT

A vehicle hub step is constructed from mesh-like material and is shaped in cylindrical form. The cylindrical form has reinforcing inner and outer end rings and also has a plurality of reinforcing bars secured in spaced apart relationship about the inner periphery thereof. The bars have inwardly extending flanges which have apertures therein for receiving the ends of the studs which support the vehicle wheel. Nuts turned onto the studs secure the hub step in place. The hub step is constructed to be sufficiently structurally sound so as to support a person thereon and is made of rust resistant material to prevent decay thereof.

6 Claims, 3 Drawing Figures

U.S. Patent     Apr. 3, 1984     4,440,411

VEHICLE HUB STEP

BACKGROUND OF THE INVENTION

1. Field of the Invention

This invention pertains to step structures for vehicles and particularly to a step structure which is mounted on the hub studs which support a vehicle wheel.

2. Statement of the Prior Art

The prior art shows step structures mounted on the spindle stud of a vehicle wheel or mounted over the hubcap of a vehicle wheel. The prior art patents are structurally dissimilar from the present invention in that they do not disclose a cylindrically shaped structure which is mounted on the hub stubs which support a vehicle wheel. Patents relating to this invention include the following U.S. patents:

| Patentee | U.S. Pat. No. | Issue Date |
| --- | --- | --- |
| W. Youngblood | 68,930 | Sept. 7, 1867 |
| R. McDonald | 182,839 | Oct. 3, 1876 |
| M. W. Ford, Jr. | 449,264 | Mar. 31, 1891 |
| J. T. Cole | 579,133 | Mar. 23, 1897 |
| J. E. Shinn | 3,288,488 | Nov. 29, 19 |
| Brooks, Jr. et al | 3,734,534 | May 22, 1973 |

SUMMARY OF THE INVENTION

This invention pertains to a hub step of cylindrical mesh-like configuration having reinforcing inner and outer end rings. A plurality of L-shaped reinforcing members are welded or otherwised secured in spaced apart relationships to the inner periphery of the cylinder and to the ring ends. The shorter legs or flanges of the L-shaped reinforcing members have apertures therein for receiving the hub studs which support the vehicle wheels. Nuts secure the hub step to the studs.

It is one object of this invention to construct a vehicle hub step which is simple and inexpensive to manufacture and easy to install.

It is another object of this invention to construct a vehicle hub step of mesh-like material which is cut into short segments and formed into cylindrical configurations.

It is yet another object of this invention to provide inner and outer reinforcing end rings on the cylindrical forms and to secure a plurality of L-shaped reinforcing members in spaced apart relationship about the inner circumference of the cylinder and secure them to the ring ends. The shorter legs of the L-members form flanges which extend radially inwardly of the cylindrical structure and have a plurality of apertures therein which receive the threaded ends of hub studs which support the vehicle wheel.

It is still a further object of this invention to construct a hub step of mesh-like material i cylindrical form which will be structurally strong enough to support a person, have rust resistant properties and have esthetic characteristics not herebefore found in vehicle hub steps.

DESCRIPTION OF THE PREFERRED EMBODIMENT

Figure 1:
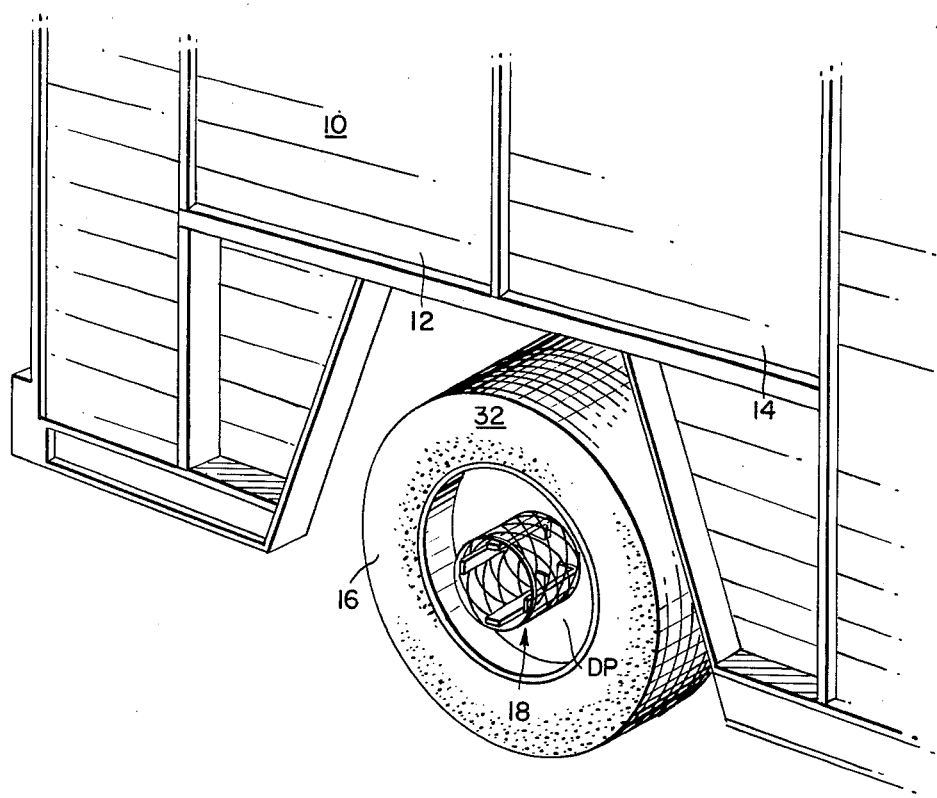
FIG. 1 is a perspective view of the hub step attached to the wheel supporting studs of a vehicle hub.
Figure 2:
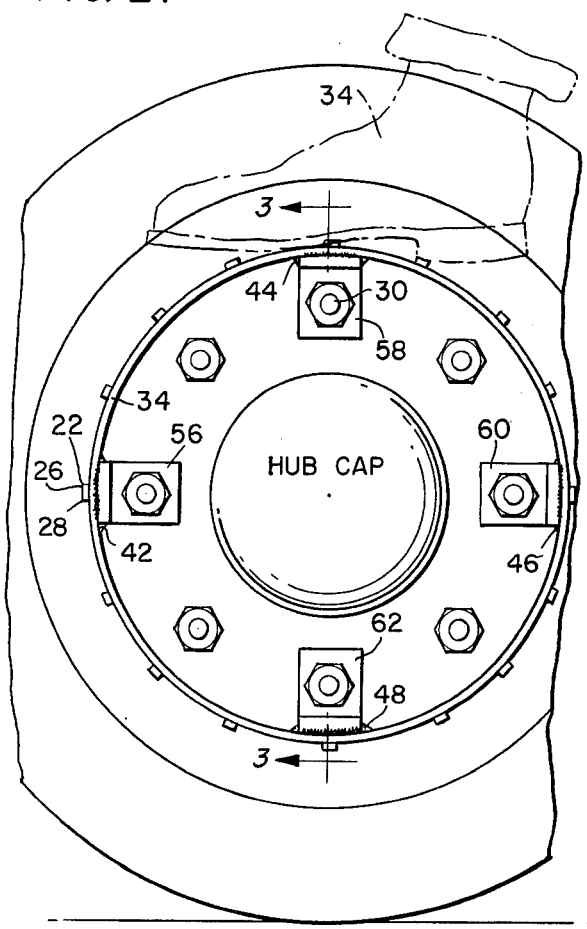
FIG. 2 is an end view of the hub step showing a plurality of reinforcing L-shaped members having ends extending radially inwardly and having apertures therein which receive the ends of threaded studs whereby the hub step is secured to the vehicle wheel by a plurality of nuts.

Referring to the drawings in more detail, FIG. 1 shows the rear left side 10 of a truck of the type which is completely closed and which has access doors 12 and 14. A rubber tired wheel 16 is shown secured to the hub of the vehicle in the usual fashion. A hub step 18 is shown secured to the vehicle wheel in a manner which will be discussed hereafter.

Figure 3:
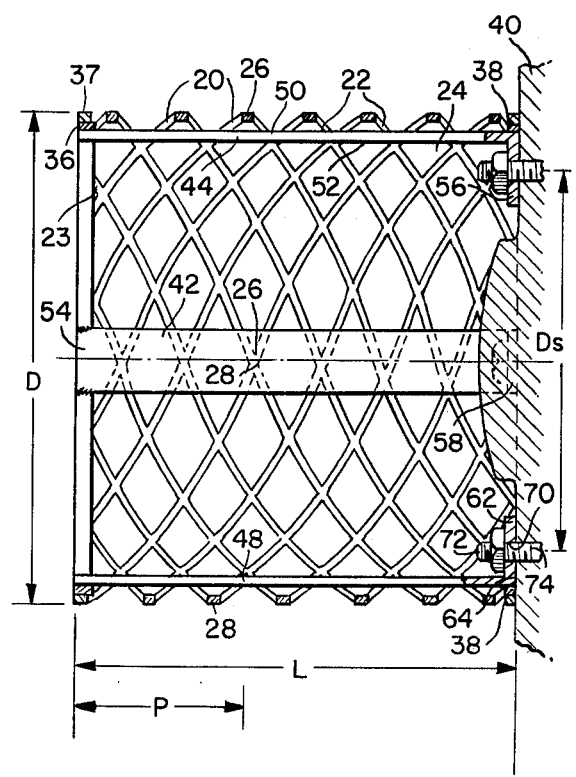
FIG. 3 is a side view of the hub step showing the mesh-like cylindrical configuration and showing reinforcing L-shaped bars having inwardly extending ends or flanges having apertures for receiving the ends of threaded studs whereby the hub step is secured to the vehicle wheel by nuts.

The hub step 18 is constructed from mesh-like structurally strong material having obliquely extending, in one direction, parallel bars 20 and obliquely extending, in the opposite direction, parallel bars 22. The spaces 24 between the mesh define open spaces. The bars 20 and 22 may be individually secured together as by welding and turned into a cylindrical configuration with the ends welded together. On the other hand, the mesh-like material may be stamped out of a flat piece of structurally strong sheet material. It will be understood that this mesh-like structure will be produced in long lengths such that a number of small sections may be cut from these lengths. These smaller sections or lengths may be bent into cylindrical form as shown and the ends 26 and 28 welded together as best seen in FIG. 3. The diameter D of the hub step 18 will be greater than the diameter Ds of the wheel supporting studs 30. The length L of the hub step 18 will be greater than the depth Dp of the wheel well such that a portion p of the hub step will extend beyond the outside surface 32 of the wheel 16 so as to support a person standing thereon as indicated by 34.

Reinforcing end ring 36 is secured such as by welding or the like to the inner periphery 23 at the outside ends 37 of the mesh work. The ring 36 is of structurally strong material and functions to add strength to the hub step 18. A similar ring 38 is secured in a similar fashion to the inside periphery 23 at the inside end 40 of the mesh work. The ring 38 is identical to ring 36 and functions to lend strength to the hub step 18.

A plurality of bars 42, 44, 46 and 48 are secured by any suitable means such as by welding about the inside periphery 23 of the hub step in spaced apart relationship as shown. The bars 42–48 have outside faces 50 (one shown), inside faces 52 (one shown), outside ends 54 (one shown) and inside flanges 56, 58, 60 and 62 which extend radially of the ring 38, in the same plane thereof. The bars 42–48 are welded as mentioned above to the ring 36 adjacent the ends 37. The inner ends 64 of the bars (one shown) are similarly welded to the inner ring 38. The flanges 52–62 have apertures 70 for receiving the threaded ends 72 of studs 74 which support the vehicle wheel 16. Nuts 76 are rotated onto the ends 72 of the stud 74 and are tightened against the flanges 56–62 to firmly secure hub step in place.

Thus constructed, the hub step of this invention is structurally sound so as to support the weight of a person standing thereon. In addition to functioning as a step for permitting a person to reach into the upper compartments of the truck, this hub step is also esthetically pleasing to look at.

The materials used will have rust resistant properties for protecting the hub step against corrosion from the elements.

While the invention has been shown and described with reference to a preferred embodiment thereof, it will be understood to those skilled in the art that various changes in form and details may be made therein without departing from the spirit and scope of the invention.

What is claimed is:

1. A vehicle hub step comprising:
   a cylinder of mesh-like material having inner and outer ends;
   inner and outer rings secured to said inner and outer ends; and
   a plurality of bars having flanges thereon secured in spaced apart relationship about the inner circumference of the cylinder, said flanges having apertures therein for receiving the threaded ends of hub studs whereby the hub step is secured to the hub of the vehicle by suitable nuts.

2. A vehicle hub step as defined in claim 1, wherein:
   said cylinder of mesh-like material being constructed from a plurality of bars welded together.

3. A vehicle hub step as defined in claim 1, wherein:
   said cylinder of mesh-like material being stamped from a sheet of solid material.

4. A vehicle hub step as defined in claim 1, wherein:
   said inner and outer rings being secured to the inner circumference of the cylinder near the ends thereof.

5. A vehicle hub step as defined in claim 1, wherein:
   said plurality of bars being spaced about the inner circumference of the cylinder equidistantly from each other and secured to the inner and outer rings, said flanges extending raidally inwardly of the inner ring in the same plane thereof, said flanges having apertures therein for receiving the threaded ends of hub studs whereby the flanges are secured to the vehicle hub by suitable nuts.

6. A vehicle hub step comprising:
   a cylinder of mesh-like material having an outer circumference, an inner circumference and outer and inner ends;
   outer and inner rings secured to the inner circumference of the cylinder adjacent the ends thereof; and
   a plurality of bars having flanges thereon, said bars being spaced about the inner circumference of the cylinder equidistantly from each other and secured to the outer and inner rings, said flanges extending radially inwardly of the inner ring and in the same plane, said flanges having apertures therein for receiving the threaded ends of hub studs whereby the hub step is firmly secured to the hub by suitable nuts.

* * * * *